United States Patent [19]

Takano et al.

[11] Patent Number: 4,978,195

[45] Date of Patent: Dec. 18, 1990

[54] OPTICAL-TO-ELECTRIC IMAGE CONVERSION SYSTEM EMPLOYING A CATHODE-RAY TUBE OR THE LIKE

[75] Inventors: Koshi Takano, Sagamihara; Kazuya Suda, Tokyo, both of Japan

[73] Assignee: Iwatsu Electric Co., Ltd., Tokyo, Japan

[21] Appl. No.: 440,655

[22] Filed: Nov. 22, 1989

[30] Foreign Application Priority Data

Dec. 7, 1988 [JP] Japan ................................ 63-309630
Dec. 9, 1988 [JP] Japan ................................ 63-311070

[51] Int. Cl.$^5$ ........................ G02B 6/08; H01J 31/50; H04N 3/14
[52] U.S. Cl. ................................ 350/96.27; 350/96.25; 250/213 VT; 358/213.13; 358/213.15; 358/225; 358/901
[58] Field of Search ............... 350/96.10, 96.24, 96.25, 350/96.27, 96.28; 250/213 VT, 227.11; 358/213.13, 213.15, 213.23, 225, 226, 901

[56] References Cited

U.S. PATENT DOCUMENTS

| | | | |
|---|---|---|---|
| 2,976,447 | 3/1961 | McNaney | 350/96.25 X |
| 3,182,223 | 5/1965 | McNaney | 358/901 X |
| 3,628,080 | 12/1971 | Lindeqvist | 250/213 VT |
| 3,683,185 | 8/1972 | Muehllehner | 250/213 VT X |
| 3,688,144 | 8/1972 | Harao et al. | 350/96.27 X |
| 3,818,131 | 6/1974 | Emmons | 350/96.27 X |
| 4,033,687 | 7/1977 | Hirayama et al. | 350/96.27 |
| 4,555,731 | 11/1985 | Zinchuk | 250/213 VT X |
| 4,558,255 | 12/1985 | Genovese et al. | 350/96.24 X |
| 4,593,199 | 6/1986 | Yaniv et al. | 250/213 VT X |

*Primary Examiner*—Brian Healy
*Attorney, Agent, or Firm*—Woodcock Washburn Kurtz Mackiewicz and Norris

[57] ABSTRACT

An apparatus for translating an optical image, as of a waveform, created by an electron beam device such as a cathode-ray tube into an electric signal. A fiber optics faceplate, having a multiplicity of optical fibers laid parallel to one another, is held against the CRT screen for transmitting the optical image to an image sensor such as that comprised of charge-coupled devices. Although preferable to optical lens systems because of far less transmission loss, the fiber optics faceplate has been susceptible to the irregular electrification of its light-exit surface, resulting in the appearance of starlike bright dots upon image reproduction from the output from the image sensor. Such irregular electrification is avoided by providing a transparent layer of electrically conducting material between the fiber optics faceplate and the image sensor.

6 Claims, 1 Drawing Sheet

OPTICAL-TO-ELECTRIC IMAGE CONVERSION SYSTEM EMPLOYING A CATHODE-RAY TUBE OR THE LIKE

BACKGROUND OF THE INVENTION

Our invention relates to an apparatus for translating an electronically produced optical image into an electric signal, and more specifically to an system comprising a cathode-ray tube (CRT) or the like for electronically displaying electric waveforms or other images on a screen, and fiber optics means for transmitting the image from the screen to an image sensor by which the image is converted from optical into electrical form.

It has been known to employ a CRT in combination with a fiber optics faceplate for photorecording the CRT traces. Comprised of an array of a multiplicity of short optical fibers, the fiber optics faceplate is held against the screen of the CRT for transmitting the optical image on to a photosensitive film with a minimum of loss. This known system makes possible the recording of ultrahigh speed transients. However, the evaluation and analysis of the recordings on the film has often been no easy task.

An optical lens system has also been used in combination with a CRT in substitution for the fiber optics faceplate. Placed in front of the CRT screen, the lens system focuses the screen image on an image sensor such as charge-coupled devices or photodiodes thereby to be translated into electric information. We object to the use of the optical lens system for transmission of the optical data. It involves greater transmission loss than does the fiber optics faceplate as the total amount of light transmitted is limited by the solid angle which is determined by the screen size, the lens diameter and the distance between screen and lens system. The optical lens system also tends to cause pattern distortions, making it difficult to accurately transmit the screen image to the image sensor.

The familiar image intensifier represents yet another conventional approach to the recording, or the translation into electric signals, of optical images. Typically, the image intensifier has a fiber optics plate with a photocathode attached to its beam-exit side for converting the incoming optical information into a beam of electrons. The beam of electrons travels through a microchannel plate thereby to be intensified. The intensified electron beam falls on a screen to visualize the input optical information. The image intensifier has another fiber optics plate held against the beam-exit side of the screen for transmitting the visualized light to an image sensor for either recording it or converting it into electric form.

The image intensifier has its own drawback well known to those versed in the optoelectronics art. The image intensifier has an anode on the beam-entrance-side face of the beam-exit-side fiber optics plate. The magnitude of the voltage applied to this anode determines the luminance of the screen. However, when this voltage exceeds 10 kilovolts, a multiplicity of starlike dots appear throughout the output from the image sensor, ruining the quality of the image and, in the worst case, making the image sensor totally inoperative. A voltage of only several kilovolts has therefore been impressed to the anode in order to avoid the appearance of such bright dots. The microchannel plate has been a conventional expedient designed to compensate for the low anode voltage. However, the very construction of the microchannel plate makes it very expensive, adding substantially to the total cost of the image intensifier.

As far as we know, the following explanation is most widely accepted by the specialists as a theory accounting for the appearance of the undesired dots. In the fabrication of glass fibers for use in the fiber optics plates of the image intensifier, there are supposedly unavoidably created localized parts of abnormally low electrical insulation resistance. The image sensor at the output stage of the image intensifier is subject to positive and negative voltages of the order of tens of volts in absolute value. Therefore, upon application of a positive voltage of 10 kilovolts or more to the anode, leakage current flows across the beam-exit-side fiber optics plate through its parts of low insulation resistance, resulting in the electrification of parts of the beam-exit-side face of that fiber optics plate. The accumulated charges on liberation from the fiber optics plate are transferred to the image sensor being held in contact with, or close to, the fiber optics plate. Another explanation is that the localized charges on the fiber optics plate induce charges on the image sensor.

We also object to the conventional image intensifier because of the considerable transmission loss taking place particularly when the image sensor is positioned opposite the fiber optics plate with a spacing therebetween. The transmission loss is due to the phenomenon known as Fresnel reflection between the confronting faces of the fiber optics plate and the image sensor. Normally, air intervenes between these opposed faces when they are spaced from each other. The refractive index of the intervening medium in this case is approximately 1.0 whereas the refractive index of the fiber optics plate is from 1.6 to 1.8, and that of the beam-entrance face of the image sensor is 2.0. These great differences in reflective index are a cause that must be remedied for reduction of the transmission loss.

A similar problem has also occurred, though to a lesser degree, even when the fiber optics plate and the image sensor are positioned in contact with each other. This is because their contacting faces can never be perfectly flat.

SUMMARY OF THE INVENTION

We have hereby discovered how to accurately translate optical information into electric information without being adversely electrically affected by means for creating the optical information. We have also found how to minimize the transmission loss of the optical information, as well as the production of interference fringes, due to Fresnel reflection.

Briefly, our invention may be summarized as an optical-to-electric image conversion system comprising electron beam means, such as a CRT, having a screen for the visible presentation of an optical image. A fiber optics faceplate, comprising a multiplicity of optical fibers laid parallel to each other, has its light-entrance side held against the screen of the electron beam means for the transmission of the optical image created thereon. An image sensor such as that comprised of charge-coupled devices, is held opposite the light-exit side of the fiber optics faceplate for translating the incoming image from optical to electric form. Also included is a transparent layer of electrically conducting material which is interposed between the fiber optics faceplate and the image sensor and which is capable of transmitting all the wavelengths of light that can travel through the fiber optics faceplate.

The transparent layer, forming the gist of our invention, serves the dual purpose of preventing the localized electrification of the light-exit side of the fiber optics faceplate and of electrostatically shielding the image sensor from the electron beam means. We have thus succeeded in minimizing noise introduction in the process of optical-to-electric translation of waveforms and other images, resulting in the marked reduction of the appearance of starlike dots.

According to a further feature of our invention, a second transparent layer of electrically insulating material is interposed between the first recited transparent layer and the image sensor, and/or between the fiber optics faceplate and the first transparent layer. Having a refractive index to be defined subsequently, the second transparent layer or layers serve to reduce transmission loss and the appearance of interference fringes through prevention of Fresnel reflection between fiber optics faceplate and image sensor. Additionally, by being fabricated from a material of a higher dielectric strength than air, the second transparent layer or layers contributes to the further reduction of the appearance of starlike dots.

The above and other features and advantages of our invention and the manner of realizing them will become more apparent, and the invention itself will best be understood, from a study of the following description and appended claims, with reference had to the attached drawings showing some preferred embodiments of our invention.

DESCRIPTION OF THE PREFERRED EMBODIMENTS

Figure 1:
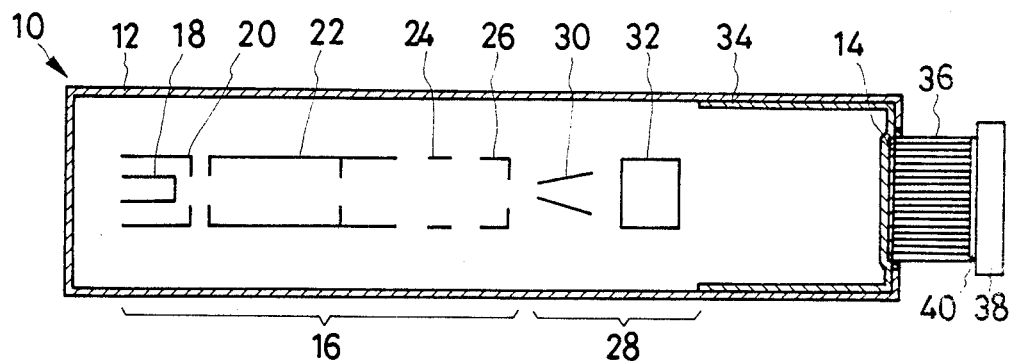
FIG. 1 is a diagrammatic longitudinal section, partly in elevation, through a preferred form of optical-to-electric image conversion system of our invention.

We will now describe our invention in detail as adapted for the conversion of the images created by a CRT from optical into electric form. Generally designated 10 in FIG. 1, the CRT illustrated therein is per se of conventional make having a hermetically sealed envelope 12 with a fluorescent screen 14 at its front end which is shown directed to the right. The envelope 12 defines an evacuated space for accommodating the various familiar working components of the CRT 10 set forth hereafter.

One of such CRT components is an electron gun 16 disposed adjacent its rear end for generating a beam of electrons directed toward the screen 14. The electron gun 16 is comprised of a cathode 18, a control grid 20, an accelerating electrode 22, a focusing electrode 24 and an astigmatism electrode 26. All these components of the electron gun 16 are arranged in that order from the rear toward the front end of the envelope 12.

Disposed along the path of the electron beam from gun 16 to screen 14 is a beam deflection system 28 for deflecting the electron beam in two orthogonal directions. We have shown the beam deflection system 28 as being comprised of a pair of vertical deflector plates 30 and a pair of horizontal deflector plates 32 by way of example. Additionally, the CRT 10 has a postaccelerating electrode 34 lining the envelope 12 at its portion between deflection system 28 and screen 14 for accelerating the deflected electron beam.

The operation of the CRT 10 is itself also conventional. Deflected in the two orthogonal directions by the deflection system 28, the electron beam from the gun 16 creates on the screen 14 a visible display of, for example, the instantaneous value and waveform of electrical quantities that are rapidly varying as a function of time.

For the translation of such optical images into electric data in accordance with our invention, there is employed, first of all, a fiber optics faceplate 36 mounted to the CRT screen 14. The fiber optics faceplate 36 is an assembly of a multiplicity of optical fibers, each with a length of, say, six millimeters or so, which are laid parallel to, and in close contact with, each other. The fiber optics faceplate 36 has its light-entrance side held against the CRT screen 14. The light-exit side of the fiber optics faceplate 36 is held opposite an image sensor 38 via a transparent layer of film 40 of electrically conducting material. Thus, as the CRT 10 visually displays a waveform or other optical information on its screen 14, the fiber optics faceplate 36 transmits the optical information to the image sensor 38, which then functions to translate the optical information into electric information.

The transparent conducting layer 40, which forms the gist of our invention, can be approximately 100 ohms per square in sheet resistance and should be capable of transmitting the light of all the wavelengths that can travel through the fiber optics faceplate 36. A preferred material of the transparent conducting layer 40 is indium oxide. We recommend the fabrication of a layer of this material in situ on the light-exit side of the fiber optics faceplate 36 by the known sputtering method. The thickness of the layer may be one micrometer or so.

The image sensor 38 can be of any known or suitable type such as that comprising charge-coupled devices. The light-entrance face of the image sensor 38 may be held opposite the transparent conducting layer 40 with or without an intervening space.

In order to confirm the utility of the transparent conducting layer 40, we made optical-to-electric conversion of waveforms by an apparatus built in conformity with the FIG. 1 arrangement and compared the results with those obtained when the transparent conducting layer was absent from the apparatus. In both cases a voltage as high as +15.4 kilovolts was impressed to the postaccelerating electrode 34 of the CRT 10 in order to increase the brightness of its display. The image sensor 38 was operated in a voltage range of −5 to +20 volts.

The images reproduced from the output from the image sensor 38 were far more free from starlike dots when the transparent conducting layer 40 was interposed between fiber optics faceplate 36 and image sensor 38 than when it was not. The same experiments have also proved that the transparent conducting layer 40 does not give any adverse effect to the functioning of the image sensor 38.

The following is our explanation of how the transparent conducting layer 40 functions to reduce the appearance of undesired dots. Formed by sputtering or other method, the transparent conducting layer 40 is in close contact with the beam-exit side of the fiber optics faceplate 36. As a result, despite the flow of leakage current across the fiber optics faceplate 36 through its parts of low insulation resistance, no localized electrification takes place on the light-exit side of the faceplate owing to the presence of the conducting layer 40 in close contact therewith. Obviously, this is because the charges created on the light-exit side of the fiber optics faceplate 36 are distributed uniformly thereover, with the consequent establishment of a uniform potential throughout the surface. There is accordingly no transfer of localized charges from fiber optics faceplate 36 to image sensor 38, or no induction of localized charges on the image sensor.

Made from indium oxide, the transparent conducting layer 40 transmits well over 80 percent of light in the wavelength range of from 0.45 to 1.50 micrometers. It can therefore satisfactorily transmit the light of all the wavelengths that can travel through the fiber optics faceplate 36.

We have employed the fiber optics faceplate 36 in preference to an optical lens system. The transmission efficiency of the fiber optics faceplate is several ten times as high as that of the optical lens system normally used in this type of optical-to-electric conversion system. The fiber optics faceplate is also preferred because it gives rise to little or no pattern distortions. The image sensor 38 comprising charge-coupled devices contributes to the ease of the measurement and analysis of waveforms and other information obtained.

Needless to say, the transparent conducting layer 40 can be fabricated from materials other than indium oxide used in this embodiment. All that is required for this layer is that it be electrically conducting and capable of transmitting all the wavelengths of light that the fiber optics faceplate can. Experiments have proved that similar results are obtainable with stannic oxide ($SnO_2$), titanium dioxide ($TiO_2$) and gold (Au), which are all well known materials of conducting films.

Also, according to the broader scope of our invention, the transparent conducting layer may be formed either in or out of contact with the image sensor. As an additional possible alternative, the transparent conducting layer may be formed on some transparent film or the like, and the resulting article may be inserted between fiber optics faceplate and image sensor with use of an epoxy or like transparent adhesive.

SECOND FORM

Figure 2:
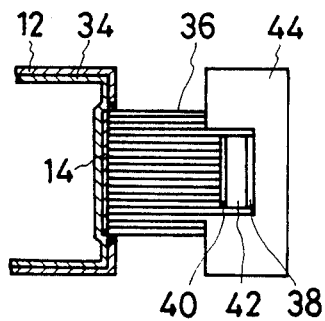
FIG. 2 is a fragmentary view somewhat similar to FIG. 1 but showing another preferred embodiment of our invention.

In an alternate embodiment of our invention shown fragmentarily in FIG. 2, a spacing is provided between fiber optics faceplate 36 and image sensor 38. Although shown greatly exaggerated for illustrative convenience, the spacing is actually of the order of several micrometers or several ten micrometers. This spacing is filled up with a transparent layer 42 of electrically insulating material. The fiber optics faceplate 36 has its light-entrance side held against the screen 14 of the CRT 10 as in the FIG. 1 embodiment. The CRT 10 can be of the FIG. 1 construction. The reference numeral 44 denotes a ceramic structure supporting the image sensor 38.

The transparent insulating layer 42 should be capable of transmitting all the wavelengths of light that can travel through the fiber optics faceplate 36. Additionally, the refractive index of the transparent insulating layer 42 should satisfy the following inequality:

$$\left\{1 - \left(\frac{n_1 - n}{n_1 + n}\right)^2\right\}\left\{1 - \left(\frac{n - n_2}{n + n_2}\right)^2\right\} >$$

$$\left\{1 - \left(\frac{n_1 - 1}{n_1 + 1}\right)^2\right\}\left\{1 - \left(\frac{1 - n_2}{1 + n_2}\right)^2\right\}$$

where
$n$ = refractive index of the transparent insulating layer 42
$n_1$ = refractive index of the transparent conducting layer 40
$n_2$ = refractive index of the light-entrance surface of the image sensor 38.

Constructed as in the foregoing, this FIG. 2 embodiment makes it possible not only to reduce the appearance of undesired bright dots but also to minimize transmission loss and the appearance of interference fringes due to Fresnel reflection at the light-exit surface of the transparent conducting layer 40 and the light-entrance surface of the image sensor 38. We will explain in the following how the transparent conducting insulating layer 42 of the FIG. 2 embodiment functions to attain the latter objective.

The left hand side of the above inequality represents the amount of light that travels through the light-entrance surface of the image sensor 38 of the FIG. 2 device when the intensity of the light that travels through the transparent conducting layer 40 after falling thereon perpendicularly is one. The right hand side of the inequality represents the amount of light that travels through the light-entrance surface of the image sensor 38 in the case where, as is conventional in the art, air (refractive index approximately 1.0) is present in place of the transparent insulating layer 42.

The transparent insulating layer 42 should therefore be fabricated from a material that satisfies the above inequality and which, additionally, does not cause denaturalization of, or otherwise give adverse effects to, the image sensor 38 and other neighboring parts of the device. We suggest epoxy, silicone and polyimide resins as preferable materials of the transparent insulating layer 42. Made of any such material, the transparent insulating layer 42 will effectively reduce transmission loss due to Fresnel reflection. Moreover, it will possess a higher dielectric strength than air and coact with the transparent conducting layer 40 for more effectively preventing the appearance of starlike dots due to the leakage current across the fiber optics faceplate 36.

Despite the showing of FIG. 2, the transparent insulating layer 42 need not necessarily be positioned between transparent conducting layer 40 and image sensor 38. Another possible location is between fiber optics faceplate 36 and transparent conducting layer 40, with the latter in close contact with the image sensor 38. In this case, however, the $n_1$ of the above inequality represents the refractive index of the fiber optics faceplate 36, and $n_2$ the refractive index of the transparent conducting layer 40.

THIRD FORM

Figure 3:
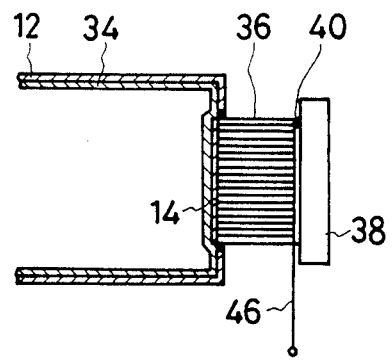
FIG. 3 is a view similar to FIG. 2 but showing still another preferred embodiment of our invention.

In FIG. 3 is shown another alternate embodiment of our invention which differs from the FIG. 1 embodiment in that a conductor 46 is connected to the transparent conducting layer 40. The other details of construction are as previously set forth in connection with the FIG. 1 device.

The conductor 46 is intended for the connection of the transparent conducting layer 40 to a source of either ground potential or a potential lower than that of the postaccelerating electrode 34 of the CRT 10. Any irregular charges on the light-exit side of the fiber optics faceplate 36 can thus be removed through the conductor 46. It will therefore be understood that the appearance of undesired bright dots can be reduced far more than in the FIG. 1 embodiment as the light-exit side of the fiber optics faceplate is maintained at a more constant potential.

POSSIBLE MODIFICATIONS

Although we have shown and described our invention in terms of some preferable embodiments thereof, we understand, of course, that such embodiments are purely illustrative of our invention. The following, then, is a brief list of possible alternations and modifications of the foregoing embodiments which we believe all fall within the scope of our invention:

1. The CRT could be of various constructions other than that illustrated in FIG. 1, examples being those including quadrupolar lenses and/or scan-expansion electron lenses.

2. The principles of our invention could be applied to image intensifiers which we have mentioned in connection with the prior art, instead of to CRTs. In the application of our invention to an image intensifier the transparent conducting layer may be provided between beam-exit-side fiber optics plate and image sensor.

3. In addition to the transparent insulating layer 42 of the FIG. 2 embodiment, another transparent insulating layer could be provided between fiber optics faceplate 36 and transparent conducting layer 40.

4. Photodiodes and other semiconductor devices rather than charge-coupled devices could be employed as the image sensor.

What is claimed is:

1. An optical-to-electric image conversion system comprising:
   (a) electron beam means having a screen for the visible presentation of an optical image;
   (b) a fiber optics faceplate comprising a multiplicity of optical fibers held parallel to each other and having a light entrance side and a light exit side, the light entrance side of the fiber optics faceplate being held against the screen of the electron beam means for the transmission of the optical image created thereon;
   (c) an image sensor having a light entrance face held opposite the light exit side of the fiber optics faceplate for translating the incoming image from optical to electric form; and
   (d) a transparent layer of electrically conducting material interposed between the fiber optics faceplate and the image sensor in order to prevent the localized electrification of the light exit side of the fiber optics faceplate.

2. The optical-to-electric image conversion system of claim 1 further comprising a second transparent layer of electrically insulating material interposed between the first recited transparent layer and the image sensor, the second transparent layer having a refractive index defined as:

$$\left\{1 - \left(\frac{n_1 - n}{n_1 + n}\right)^2\right\}\left\{1 - \left(\frac{n - n_2}{n + n_2}\right)^2\right\} >$$

$$\left\{1 - \left(\frac{n_1 - 1}{n_1 + 1}\right)^2\right\}\left\{1 - \left(\frac{1 - n_2}{1 + n_2}\right)^2\right\}$$

where
  $n$ = refractive index of the second transparent layer
  $n_1$ = refractive index of the first transparent layer
  $n_2$ = refractive index of the light-entrance face of the image sensor.

3. The optical-to-electric image conversion system of claim 2 wherein the second transparent layer has a higher dielectric strength than air.

4. The optical-to-electric image conversion system of claim 1 further comprising a second transparent layer of electrically insulating material interposed between the fiber optics faceplate and the first recited transparent layer, the second transparent layer having a refractive index defined as:

$$\left\{1 - \left(\frac{n_1 - n}{n_1 + n}\right)^2\right\}\left\{1 - \left(\frac{n - n_2}{n + n_2}\right)^2\right\} >$$

$$\left\{1 - \left(\frac{n_1 - 1}{n_1 + 1}\right)^2\right\}\left\{1 - \left(\frac{1 - n_2}{1 + n_2}\right)^2\right\}$$

where
  $n$ = refractive index of the second transparent layer
  $n_1$ = refractive index of the fiber optics faceplate
  $n_2$ = refractive index of the first transparent layer.

5. The optical-to-electric image conversion system of claim 4 wherein the second transparent layer has a higher dielectric strength than air.

6. The optical-to-electric image conversion system of claim 1 further comprising discharge means electrically connected to the transparent layer for the removal of charges from the light exit side of the fiber optics faceplate.

* * * * *